United States Patent Office 2,843,613
Patented July 15, 1958

2,843,613

METHOD OF SEPARATING MOLYBDENUM FROM TUNGSTEN

Robert C. Osthoff, Schenectady, N. Y., assignor to General Electric Company, a corporation of New York No Drawing. Application May 22, 1956
Serial No. 586,374

4 Claims. (Cl. 260—429)

This invention relates to a method of separating molybdenum from tungsten and to the recovery of molybdenum and tungsten from impure materials, such as ores. This invention also relates to compounds formed from the reaction of dialkyltin halide with salts of (1) tungstic acid and (2) molybdic acid. These compounds are dialkyltin tungstate and dialkyltin molybdate.

Molybdenum and tungsten often occur together in ores, and in the treatment and extraction of such ores the separation of these elements from each other is usually desired. Sometimes molybdenum and tungsten are present in such forms that their separation by mechanical means is relatively easy. But in some ores, particularly in scheelites, a substantial proportion of molybdenum is present as an isomorphic replacement of tungsten. Molybdenum occurring in such form is not easily separable from tungsten. Scheelite is a calcium tungstate ore having the properties disclosed in "Tungsten" by Li and Wang, p. 9 (Reinhold 1955). The impurities in any specific scheelite ore will depend on the source of the ore.

Since electric lamp filament grade tungsten metal requires a low molybdenum content to be useful and since many ores, particularly the scheelites, contain high percentages of molybdenum, it is of great importance to remove or reduce the molybdenum content of the tungsten.

I have now discovered that a dialkyltin halide, such as dimethyltin dichloride, will react with salts of molybdic and tungstic acids to form the dimethyltin salts thereof. I have further discovered that dimethyltin molybdate is completely soluble in concentrated hydrochloric acid while dimethyltin tungstate is not. Because of this difference in solubility, it is possible to separate tungsten from molybdenum.

One method of extracting the metal from the ore containing molybdenum and tungsten, such as found in scheelite or a concentrate thereof, comprises digesting the finely ground ore with an alkaline solution for a period of time sufficient to dissolve both tungsten and molybdenum.

Preferably an alkali metal hydroxide such as caustic soda or alkali metal carbonate is employed in the digestion and an excess of this reagent is used. The ground ore may be mixed with solid caustic soda and water may be added to the mixture to form a slurry. The digestion with caustic soda is preferably conducted under pressure at an elevated temperature, for example about 180° C. and at this temperature the digestion is usually completed in about five hours. By this method a solution containing sodium molybdate and sodium tungstate and an insoluble residue containing calcium hydroxide is produced.

The solution derived from the digestion step is diluted with water and then filtered to remove calcium hydroxide and other insoluble materials derived from the ore. This filtrate, a solution of the sodium salts of molybdic and tungstic acids, is then treated with dimethyltin dichloride to form a precipitate of dimethyltin tungstate and dimethyltin molybdate which is removed by filtration.

This filtrate is then heated in concentrated hydrochloric acid (about 35% HCl, based on total weight), the suspension formed (a precipitate of yellow tungstic acid) is then cooled to room temperature, filtered and washed with concentrated hydrochloric acid. The tungstic acid can then be dihydrated in a furnace to tungstic oxide. Since the hydrochloric acid filtrate also contains tungsten, it can be recycled in the process so as to remove most of the tungsten extracted from the ore.

Many other methods of digesting tungsten ores useful in preparing soluble salts of tungstic and molybdic acids are found in the literature, for example, in Li and Wang, "Tungsten," pp. 166–212 (Reinhold Publishing Corp., N. Y., 3rd ed., 1955). Solutions obtained by these processes may be used in this invention.

In carrying out the process it is desirable to use as finely divided an ore as is available, taking into consideration the economics involved. I have advantageously employed ore of 100–300 mesh. In carrying out the process the stoichiometry of the reaction must be considered in calculating the amounts of dimethyltin dichloride used in the process. Thus, at least one mole of dimethyltin dichloride based on combined moles of tungsten and molybdenum is employed for complete reaction. However, an excess is desirable since it tends to shift the equillibrium in the desired direction. Thus, I advantageously employ from 1 to 1.5 or more moles but preferably 1.1 to 1.2 moles of dimethyltin dichloride. The temperature of reaction is not critical. The reaction can be run at below room temperature to 100° C. or higher. Because reaction is substantially instantaneous at room temperature, that temperature is usually employed.

In digesting the dimethyltin-tungstate and molybdate, stoichiometry requires at least 2 moles of hydrochloric acid. However, it is advantageous to use excesses, for example 4 to 200 moles and preferably 10 to 50 moles of hydrochloric acid for each mole of the dimethyltin salt. The digestion is carried out at 40–100° C. or higher, but preferably 80–100° C., at times of from 1 to 5 hours or longer, but preferably 2 to 3 hours. Concentrated hydrochloric acid is preferably used in the digestion.

Among the soluble salts of molybdenum and tungstic acid which can be used are ammonium salts, salts of Group IA of the Periodic Table, such as lithium, sodium, potassium, rubidium, cesium, etc. These can be reacted with dimethyltin dichloride to form dimethyltin molybdate and tungstate.

In order that those skilled in the art may better understand how the present invention may be practiced, the following examples are given by way of illustration and not by way of limitation. All parts are by weight unless otherwise stated. The dimethyltin dichloride used was recrystallized from C. P. benzene and finally dried in a vacuum. Analysis calculated for $(CH_3)_2 SnCl_2$ was Cl 32.3; Sn 54.0. Found: Cl 32.4; Sn, 53.9.

Example 1

The following example illustrates the preparation of dimethyltin tungstate.

Dimethyltin dichloride, 22 parts, was dissolved in 100 parts of water. The solution was slightly cloudy and was suction-filtered through a retentive filter. Then 33 parts of Folin grade sodium tungstate dihydrate was dissolved in 100 parts of water. Thus, equimolar ratios of dimethyltin dichloride and sodium tungstate dihydrate were reacted. Dilute hydrochloric acid was added to this solution until the pH was reduced to 9. When the solutions of sodium tungstate and dimethyltin dichloride were mixed, a white precipitate formed immediately. The suspension was digested for two hours at 100° C. on a steam bath and then allowed to cool slowly to room temperature. The solid was then filtered, washed three times with 20 parts of water each time and air dried overnight. Glassy lumps of hydrated dimethyltin tungstate $((CH_3)_2SnWO_4 \cdot 2H_2O)$ were removed from the filter in 80 percent yield and dried to constant weight at 105° C. Anal. calcd. for $(CH_3)_2SnWO_4$: Sn, 29.9; W, 46.4; C, 6.1; H, 1.5. Found: Sn, 29.4; W, 46.0; C, 5.7; H, 1.7.

*Example 2*

The following illustrates the preparation of dimethyltin molybdate.

The preparation of dimethyltin molybdate was carried out in a manner similar to that employed in the preparation of the tungstate. To 100 parts of water was added 24.2 parts of sodium molybdate dihydrate and this solution was then added to 100 parts of water containing 22 parts of dimethyltin dichloride solution (equimolar ratios) and a white precipitate was formed instantly. This precipitate was filtered and air dried and the solid recovered in about 90% yield. Anal. calc. for $(CH_2)_2SnMoO_4$: C, 7.8; H, 2.0; Sn, 38.4; Mo, 31.1. Found: C, 7.5; H, 1.8; Sn, 38.0; Mo, 30.7. It is interesting to note that no water of constitution is observed in the molybdenum compound and that in contrast to the tungsten compound which had a glassy appearance, the molybdenum compound was a white powder.

*Example 3*

The following illustrates the separation of tungsten from molybdenum.

A sample of 30 parts of the 50-50 weight mixture of the dihydrates of sodium tungtate and sodium molybdate was dissolved in 110 parts of water. Dilute hydrochloric acid was added to this solution until the pH was reduced to about 9. Then 110 parts of a solution containing 28 parts of dimethyltin dichloride were added to the solution of the tungstate and molybdate. The white precipitate which formed immediately was digested on a steam bath at 100° C. for two hours and then cooled to room temperature. The solids were filtered, washed and then air-dried overnight. This mixture was then dried to constant weight at 105° C. Thirty six parts of product which corresponded to what would theoretically be expected were recovered. A sample of this mixture was air-dried at 105° C. for an additional 24 hours, and the tungsten-to-molybdenum ratio ($0.15 \pm 0.02$) was then determined by means of X-ray emission spectroscopy. The tungsten-to-molybdenum ratio in the mixture of dimethyltin compounds was about the same as in the original mixture.

Twenty parts of the mixture of dimethyltin compound produced above were then heated on a steam bath for two hours with 250 parts by volume of concentrated hydrochloric acid. The suspension which contained a precipitate of yellow tungstic acid was cooled to room temperature over a period of several hours and was then filtered. The precipitate was washed with 50 parts by volume of concentrated hydrochloric acid and 50 parts of water. The filtered tungstic acid was dehydrated for two hours at 750° C. in a muffle furnace. The tungsten-to-molybdenum ratio in the residue was found by X-ray emission spectroscopy to be $65 \pm 7$. This indicates that the molybdenum concentration in the original sodium tungstate-sodium molybdate mixture was decreased by a factor of $591 \pm 60$ from the concentration of molybdenum in the original mixture of sodium tungstate and sodium molybdate. Thus, a substantial separation has been effected by the procedure outlined above. Since the filtrate from this process contains tungsten, it can be recycled in the process to remove most of the tungsten extracted from the ore.

*Example 4*

The following illustrates the separation of tungsten from molybdenum in an ore.

One hundred parts of a scheelite ore concentrate (50% tungsten and 2.15% molybdenum) are heated with agitation at 180° C. under pressure with 100 parts of sodium hydroxide dissolved in water for about five hours. After the digestion period, the mixture is diluted with an equal volume of cold water and the solution filtered.

Hydrochloric acid is added to this solution until a pH is reduced to about 9. Then a solution containing 60 parts of dimethyltin dichloride is added to the solution to form a white precipitate which is heated at about 100° C. for two hours. Upon cooling to room temperature the solids are filtered, washed and dried overnight at 100–110° C.

This precipitate is then heated in concentrated hydrochloric acid at 100° C. for about two hours. The yellow suspension formed is slowly cooled to room temperature, filtered, washed with concentrated hydrochloric acid and finally washed with water. The $WO_3$ formed on ignition has a low molybdenum content suitable for the preparation of electric filament tungsten. The hydrochloric acid filtrate produced in the process is recycled to increase the tungsten yield.

Other dialkyltin dihalides, for example diethyl-, dipropyl-, dibutyl-, diisopropyl-tin dihalides may also be used to form corresponding molybdates and tungstates with proper adjustments for solubility. However, these are less suitable for aqueous reactions since they are not as water soluble as the dimethyltin compound. Other dialkyltin dihalides are disclosed in "Tin" by Mantell, pp. 444–447 (Reinhold Publishing Co., 1949) in Tables 42, 43 or 44.

In addition to being useful as a means of separating tungsten from molybdenum, dimethyltin tungstates and molybdates can be used in glass making, ceramics, etc. Dimethyltin tungstate is also useful as a radiation indicator, for upon exposure to high energy radiation, such as X-rays, it turns from white to brown. Unexpectedly, no such change occurs with dimethyltin molybdate.

Tungsten oxide produced in this process can be converted to tungsten by hydrogen reduction or by any of the methods known to the art (cf. Li and Wang "Tungsten," p. 195–269). The tungsten so produced can be used in the preparation of wires, rods, sheets, in electric lamp filaments, powder metallurgy, etc.

What I claim as new and desire to secure by Letters Patent of the United States is:

1. A process of separating tungsten from molybdenum which process comprises (1) treating a solution of salts of tungstic and molybdic acids with a lower dialkyltin dihalide to precipitate a mixture of the lower dialkyltin salts of said acids, (2) digesting this precipitate in concentrated hydrochloric acid to dissolve the lower dialkyltin molybdate and to leave behind a precipitate of the tungsten compound.

2. The process of claim 1 wherein dimethyltin dichloride is employed.

3. A process of separating compounds of molybdenum and tungstens from ores containing these elements, which process comprises (1) digesting the ore to dissolve molybdenum and tungsten compounds, (2) separating this solution from the insolubles, (3) treating this solution with lower dialkyltin dihalide to form a precipitate of a mixture of the lower dialkyltin salts thereof, (4) digesting this precipitate in concentrated hydrochloric acid to dissolve the lower dialkyltin molybdate and to leave behind a precipitate of the tungsten compound.

4. The process of claim 3 wherein the dimethyltin chloride is employed.

References Cited in the file of this patent
UNITED STATES PATENTS 2,255,210　　Furey　_____ Sept. 9, 1941

OTHER REFERENCES

Rochow et al.: "JACS," 75, 3099–3101 (1953).